July 18, 1933.  J. C. RADNOR  1,918,426
AIRCRAFT LANDING GEAR
Filed Feb. 13, 1931    7 Sheets-Sheet 1

INVENTOR
Jess C. Radnor

July 18, 1933.  J. C. RADNOR  1,918,426
AIRCRAFT LANDING GEAR
Filed Feb. 13, 1931     7 Sheets-Sheet 2

INVENTOR
Jess C. Radnor

Fig. 8

July 18, 1933.   J. C. RADNOR   1,918,426
AIRCRAFT LANDING GEAR
Filed Feb. 13, 1931   7 Sheets-Sheet 4

INVENTOR
*Jess C. Radnor*

July 18, 1933.  J. C. RADNOR  1,918,426
AIRCRAFT LANDING GEAR
Filed Feb. 13, 1931   7 Sheets-Sheet 5

INVENTOR
Jas C. Radnor

July 18, 1933. J. C. RADNOR 1,918,426
AIRCRAFT LANDING GEAR
Filed Feb. 13, 1931 7 Sheets-Sheet 7

INVENTOR
Jess C. Radnor

Patented July 18, 1933

1,918,426

UNITED STATES PATENT OFFICE

JESS C. RADNOR, OF NEW YORK, N. Y.

AIRCRAFT LANDING GEAR

Application filed February 13, 1931. Serial No. 515,537.

This invention relates to means for moving the members or structures comprising the landing gear or alighting carriage of aircraft from their operating position as landing means to other positions about the aircraft when the same is in flight for the purpose of reducing the parasitic resistance to the wind or "drag" presented by the surfaces of the various parts comprising landing gear or carriage, and this invention is applicable to aircraft designed to alight upon land or water and/or both.

In aircraft, it is desirable to reduce the amount of so called "parasitic resistance" or "wind drag" set up by the various parts of the landing gear when the aircraft is in flight. The resistance offered by these parts is called parasitic because it is resistance to the passage of the air through which the aircraft is traveling caused by parts of the aircraft which do not contribute to its propulsion after it has left the ground and is in the air. The landing means, comprising contact means with the medium upon which the aircraft comes to rest, whether land or water, must necessarily be in an extended or spaced position relative to the other parts of the aircraft just before and during the time that the aircraft is alighting or taking off so as to prevent the fuselage, wings, propellers or other parts of the aircraft coming into contact with the land or water, whichever the case may be. In such a position, the wheels, floats, pontoons, or hulls together with their axles, struts, and spacing members, and shock absorbers set up parasitic resistance when the aircraft is in flight and impair its efficiency.

It is an object of this invention to provide means whereby the landing or alighting means may be in proper extended position when the aircraft is alighting upon, or taking off from land or water and may be removed to other desirable positions about other parts of the aircraft and out of the windstream when it is in flying position, such means to be under the control of the pilot or operator. These desirable positions may be adjacent the body or fuselage of the aircraft or adjacent engines or engine nacelles mounted on the fuselage or along the wings, or other parts of the aircraft.

This invention relates particularly to hydraulic and/or pneumatic means for moving the wheels, floats, pontoons, skids, or hulls, axles, struts, spacing members and shock absorbers used as alighting means for aircraft from the alighting position to the retracted position.

In describing my invention, the terms applicable to aircraft will be used in their broadest sense. The term "aircraft" is used to designate and include airplanes, hydroplanes, seaplanes, flying boats and the so-called "amphibians" provided with wheels for alighting upon land and hulls, pontoons or floats for alighting upon water. By "alighting means" is meant all types and forms of apparati employed to enable aircraft to take-off from and come to rest upon land or water and/or both and includes wheels, pontoons, floats, hulls, and skids together with the axles, struts, wires, brakes, and shock absorbers which are incorporated in the particular combination and design of any aircraft. The term "alighting position" will be used to designate that position assumed by the alighting means of any of the various aircraft for the purpose of making contact with the land or water and/or both which it is designed to ride upon. The term "sheltered position" will be used to designate that position assumed by the alighting means in the several preferred embodiments of this invention described and illustrated herein for the purpose of reducing the parasitic resistance or "wind drag" set up by said alighting means by positioning same adjacent to other parts of the aircraft such as fuselage or body, engines, engine nacelles, wings or any other part not of the alighting means or by merely changing the position of the various parts of the alighting means for the purposes of presenting a more streamlined periphery of same.

While many various forms and modifications of my invention will occur to those skilled in the art without departing from the principles thereof, in the preferred embodiments of the invention there is comprised a retracting and distending mechanism for the purpose of moving the alighting means from the alighting position to the sheltered position after the craft is in the air and to thrust the alighting means into alighting position when it is desired to bring the aircraft to earth or water. This retracting and distending mechanism is operated by hydraulic means under the control of the pilot in the aircraft, and is connected to the alighting means and some other part of the aircraft in cooperation with suitable pivoting, spacing and axle gear to control the relative movement between the alighting means and the aircraft. The retracting and distending mechanism performs the function, when the alighting means is in alighting position, of maintaining the same in extended position, either rigidly or with desirable resiliency.

The retracting and distending mechanism comprises a plurality of cylinders of different inner and outer dimensions and in telescopic relationship of cylinders and pistons sliding longitudinally along a substantially common axis. A number of these cylindrical members together with an innermost piston and rod comprises a series of one or more cylinder chambers having a common fluid connection to a source of fluid pressure and evacuation located at some convenient place upon the aircraft. The retracting and distending mechanisms are interposed between the aircraft and the wheels or floats of the alighting means through connecting means of universal articulation, such as ball and socket joints and the like. A series of cooperating cylinders form a retracting and distending mechanism which may be used singly or in combination with one or more other retracting and distending mechanisms to perform the function of retracting and distending the alighting means upon an aircraft.

Evacuation of the fluid chambers draws the pistons into the cylinders in such manner as to effect a longitudinal contraction of the overall length of the retracting and distending mechanism, effecting a movement of the alighting means to the desired sheltered position. Expanding the chambers by fluid means results in a longitudinal distension of the retracting and distending mechanism and moves the alighting means into alighting position and holds it there rigidly or resiliently when desired. The landing and riding shocks are taken resiliently along the substantially common longitudinal axis of the retracting and distending mechanism because of the compressibility of the fluid medium within.

One of the particular features of this invention is the construction whereby one or more cylinder chambers comprising the retracting and distending mechanism have a fluid connecting means with one another and with the centrally located source of fluid pressure and evacuation which is operable at any position of the parts within the limits of their contracting and distending range.

It is another feature of this invention to provide a mechanism for the purpose of furnishing retracting and distending motion to the alighting means of an aircraft which is capable of reducing its overall length when fully contracted to less than one-half of its distended or extended length.

It is another feature of this invention to provide a mechanism for the purpose of furnishing retracting and distending motion to the alighting means of an aircraft which is capable of reducing its overall length when fully contracted to less than one-half of its distended or extended length and which is capable of withstanding and cushioning the landing and riding shocks received by the landing gear or alighting means of an aircraft.

The linkage means, comprising the struts, axles, guide wires and spacing members which cooperate with the retracting and distending mechanisms to control the movement of the alighting means, may be arranged in many different ways to secure the greatest benefits of design of different aircraft in placing the alighting means in various positions of shelter when in flight. In the preferred embodiments of my invention, described and illustrated herein, as applicable to different types of aircraft, the wheels or floats are mounted upon members pivoted in such manner that the alighting means can be swung from extended or alighting position to sheltered or flight position by such pivoting and movement, which is accomplished by the contraction or distension of the retracting or distending mechanism.

The alighting means may be operably connected to the aircraft in such manner that the weight of the aircraft and the landing and riding shock are carried directly by the retracting mechanism in a direction generally through its substantially longitudinal axis, as in some of the preferred embodiments of this invention; or the weight, landing, and riding shocks may be borne by other members of the lighting means connected to other parts of the aircraft without the retracting or distending mechanism performing this function.

The arrangement of the linkage means for the alighting means in cooperation with the retracting and distending mechanisms may take any of the various forms for securing relative movement between two objects and no limitation is intended by the phraseology, dimensions or numbers of parts used herein to describe the general principles and some of the preferred embodiments of this invention.

The means whereby the objects of this invention are attained and some particular application thereof will be more clearly understood by reference to the following description together with the accompanying drawings, in which:—

Figures 1, 2, 3, 4:
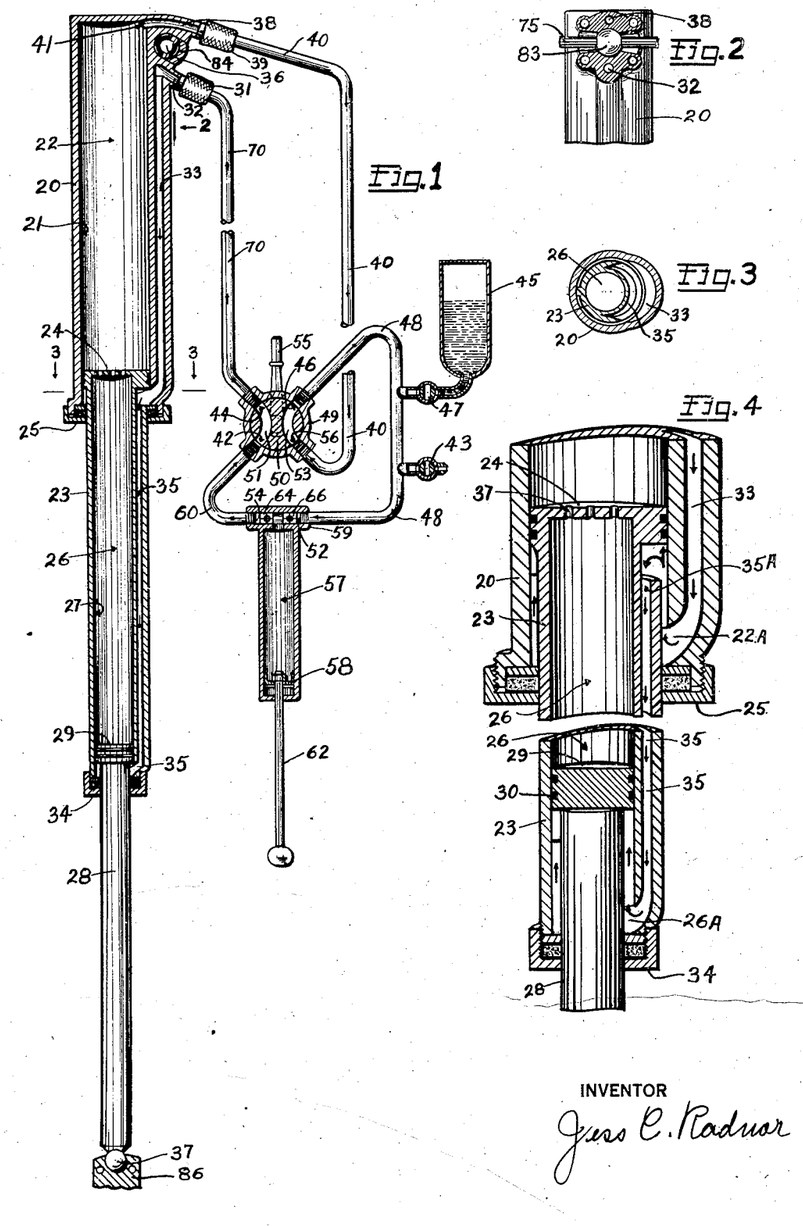
Figure 1 is a sectional view along the longitudinal axis of a retracting and distending mechanism and of the various members comprising the fluid pressure and evacuating means, and showing said mechanism and said fluid means in position to be contracted.
Figure 2 is a view in section through the socket attachment means for connecting the retracting and distending mechanism to the aircraft taken on the line 2 of Figure 1.
Figure 3 is a view in cross section taken along line 3—3 of Figure 1 showing the relation of the walls of the cylindrical members of the retracting and distending mechanism.
Figure 4 is an enlarged view in section of parts of the retracting and distending mechanism, showing the parts of the retracting and distending mechanism slightly advanced toward retracted position.

Referring now to Figure 1, 20 is the outermost cylindrical member of the retracting and extending mechanism having an inner bore or cylindrical surface 21 in which the intermediate cylindrical member 23 reciprocates longitudinally. A piston head 24 is provided at the top of the cylindrical member 23, carries a plurality of piston rings in order to prevent the passage of fluid around the piston head 24 as it reciprocates within the bore 21 of the cylindrical member 20.

The intermediate cylindrical member 23 has an internal bore 27 and the piston rod 28 is provided with a piston head 29 also fitted with a plurality of piston rings 30 and adapted to reciprocate within the bore 27 of the intermediate cylindrical member 23.

The lower end of the cylindrical member 20 is fitted with a suitable packing means, such as the gland and nut indicated generally by 25. Similarly, cylindrical member 23 is equipped at its lower end with a suitable packing means such as the gland and nut indicated generally by 34. Gland nut 25 is threaded onto the cylindrical member 20 after the insertion of the head 24 and serves to limit thereby the extended position of cylindrical member 23. The gland nut 34 is threaded onto the cylindrical member 23 after the head 29 of the rod 28 is inserted into the bore 27 and thereby serves to limit the extended movement of the rod 28.

Near the top of the cylindrical member 20 there is a socket 36 to receive a ball joint 83 carried by the air craft. The ball joint 83 is secured to the member 20 by the socket clamp 84 which is secured in some suitable manner, as by four bolts threaded into the member 20. The ball and socket joint 83—

84 secures the cylinder 20 and its associated mechanism to the aircraft. At the bottom of rod 28, there is provided a ball 37 adapted to fit into suitable socket members attached to the different alighting means of various types of aircraft, such as the socket members 86 of Figure 10. The retracting and distending mechanism is caused to retract, or telescope, in the following manner: The valve core 50 is placed in the position shown in Figure 1, by means of the valve handle 55 thereby connecting the pipe 40, which connects with the passage 38 by means of the flexible hose 39, with the pipe 48 by means of the valve passage 53 in the valve core 50. Pipe 48 leads from the valve port 46 of the valve casing 49 to the port 52 of the casing 59 of any suitable pumping means, such as the cylindrical pump chamber 57, the pump piston 58 and rod 62, together with the flow control check-valves 66 and 64, arranged to permit the passage of fluid in one direction which is indicated by the arrows in the pipes 48 and 60. From the port 54 of the pump, pipe 60 connects port 42 of the valve casing 49, which is connected through passage 51 of the valve core 50 to the port 44 of the casing and pipe 70, connected at its other end to the passage 32 in the member 20 by means of the flexible hose 31. Check valve 66 is designed to permit the fluid within the pipe 48 to flow in the direction of the arrows therein and thereby to admit fluid to the pump chamber 57 upon the suction stroke of the piston 58 and to resist and prevent the passage of the fluid upon the compression stroke of the piston 58. Check valve 64 is adapted to permit the escape of the fluid through pipe 60 from the pump chamber 57 upon the compression stroke of the piston 58.

When the valve core 50 is in the position of Figure 1, the intake port 52 of the pump means 57—62 is connected through pipes 48, passage 53, pipe 40, hose 39 and passage 38 to the cylinder chamber 22 and through a plurality of apertures 37 in the piston head 24 to the cylinder chamber 26. Operation of the pump means 57—62 will thereby draw the fluid within the chambers 26 and 22 through the fluid system just mentioned into the chamber 57 and through the pipe 60, valve passage 51 and pipe 70 under pressure to the passage 32 which is connected to the longitudinally extending passage 33 within the wall of the cylindrical member 20.

The passage 33 connects with that portion of the cylinder chamber 22, which is below the piston head 24 in its lowermost position and is designated by 22A, Figure 4. The portion 22A of the chamber extends around the intermediate cylinder 23 which has an outer diameter smaller than the chamber 22 of the member 20 thereby defining 22A as a circular chamber below the piston head 24.

The intermediate cylinder 23 is provided with a longitudinally extending passage 35 connecting at the upper end with the chamber 22A through the aperture 35A and at its lower end with the circular passage 26A which is that portion of the cylinder chamber 26 below the piston head 29 carried on the rod 28.

Figure 5:
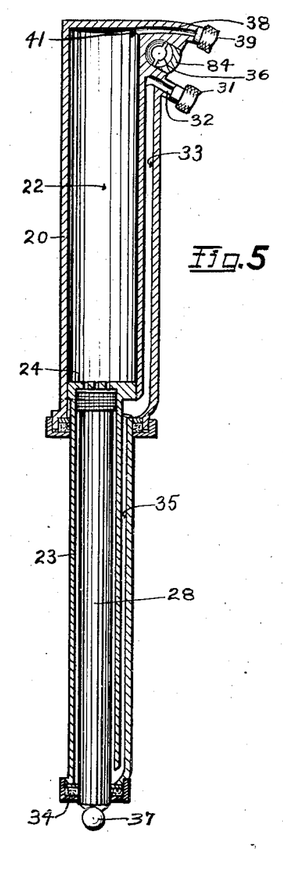
Figure 5 is a view partly in section showing a part of the retracting and distending mechanism, wherein the rod and piston are retracted into the cylinder chamber of the intermediate member.
Figure 6:
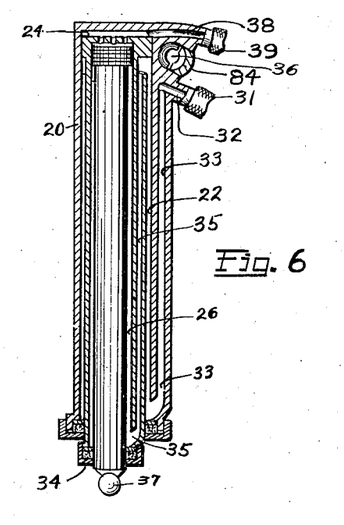
Figure 6 is a view showing parts of the retracting and distending mechanism in the fully retracted position, wherein the rod is drawn into the cylinder chamber of the intermediate member and said intermediate member is retracted into the cylinder chamber of the outer cylindrical member.

Fluid pressure introduced into the passage 33 exerts a pressure in the connected chamber 22A, passage 35, chamber 26A and against the under side of the piston head 29 thereby forcing said head 29 and rod 28 into the chamber 26 until it reaches its limit of travel against the under side of the piston 24 as shown in Figure 5. There being no further movement of the piston 29 possible, the pressure continues to the chamber 22A and exerts against the under side of the piston head 24, said piston head 24 and intermediate cylinder 23, together with the enclosed rod 28 are forced upward into the cylinder chamber 22 of the cylindrical member 20 until it reaches its limit of travel against the upper end of the cylinder chamber 22 as shown in Figure 6. Thus the fluid contents of the chamber 26 and 22, forced through the series of connected passages and chambers by the pumping means 57—62 into those portions of the chambers below the piston heads 24 and 29 forces these pistons into their uppermost or retracted position and thereby effecting a relative movement between the aircraft to which the mechanism is connected by ball and socket joint 36, 83 and 84 and the alighting means connected to the mechanism by the ball and socket joint 37 and 86.

For purposes of illustration and description, the rod 28 and head 29 has been shown to have reached its completely retracted position within the chamber 26 of the intermediate member 23, before the intermediate member 23 has started upon its retraction movement into the cylinder chamber 22 of the cylindrical member 20, but it should be understood that in actual operation of a retracting and distending mechanism built according to this invention, the movement of the rod 28 and the intermediate member 23 may be simultaneous at the same or different rates of travel.

When the retracting and distending mechanism is fully contracted and the alighting means has reached the limit of its travel toward the flight, or sheltered position the alighting means may be maintained in such position by closing the fluid line whereby the rod 28 and intermediate cylindrical member 23 are held in position withdrawn into their respective bores as in Figure 6 by maintaining pressure in the fluid line 33—22A, 35, and 26A. This is accomplished by moving the valve handle 55 to position the valve core 50 as in Figure 8, wherein the valve passages 51 and 53 do not connect any of the ports 42, 44, 46 and 56 and the fluid pipes 70 and 40 with their connecting passages and conduits are closed by the solid walls of the valve core 50. The retention of the alighting means in sheltered position may also be assisted or wholly accomplished by some suitable locking or grappling means connected to the aircraft which becomes effective after the completion of the retracting movement. The use of such locking or grappling means is contemplated in connection with the retracting and distending mechanism of this invention but is not shown here.

Figure 7:
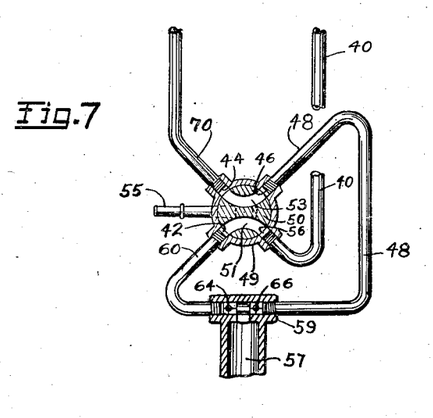
Figure 7 is a view in section of the valve means incorporated in the fluid pressure and evacuating means, said valve being in position for distending or elongating the retracting and distending mechanism.

When it is desired to withdraw the alighting means from sheltered or flight position to alighting or extended position, the valve handle 55 is moved into horizontal position, thereby positioning the valve core 50, as in Figure 7, thereby connecting ports 44 and 46 by valve passage 53 and connecting ports 42 and 56 by valve passage 51, which connects the passages 33 of member 20 and 35 of the member 23 with the intake port 52 of the pumping means 57—62 through pipes 70, passage 53 and pipe 48 and pipe 60 connecting outlet port 54 of the pump through valve passage 51 with pipe 40 and passage 38 to the chambers 22 and 26. With the valve core 50 in this position, the operation of the pumping means evacuates the passages 33 and 35 and the spaces between the rod 28 and the cylinder wall 27 of the intermediate cylinder 23 and the space between the outer wall of the intermediate member 23 and the inner wall 21 of the cylinder chamber 22 by drawing the fluid through the pipes 70, passage 53 and pipe 48 and forcing it through pipe 60, passage 51 and pipe 40 into the chambers 22 and 26 thereby forcing down the piston heads 24 and 29 in their respective cylinders. Sometimes it may not be necessary to exert a pressure to return the retracting and distending mechanism to the distended position for the weight of the alighting means which it supports may be sufficient to pull the member into extended position through gravity when the pressure in the fluid system is released. When the retracting and distending mechanism is in extended position, valve core 50 may be locked in closed position as in Figure 8 retaining the pressure in the chambers 22 and 26 to support the weight of the aircraft against the alighting means as in those embodiments of this invention where the retracting and distending member withstands alighting and riding shocks in a direction along its substantially common axis. In such a position of the valve core 50, the retracting and distending mechanism presents a yielding resistance to the longitudinal force and through the compressibility of the fluid medium within the chambers 22 and 26, serves to cushion the shocks received by the alighting means.

The fluid to be used in this invention may be air or oil or glycerine or any combination of air or oil or glycerine or other suitable fluid means. The fluid storage tank 45 with the valve 47 and the valve 43 connecting the pipe 48 with atmosphere, when open, may be used by the operator to maintain within the fluid line as a whole a desirable combination of suitable fluids or liquids and the pressure therein may be regulated by the use of the pumping means 57—62 and the valve 43. Such fluid line comprises the chambers 26 and 22 and the passage 38, pipe 40, passage 53, pipe 48, pump chamber 57, pipe 60, passage 51, pipe 70, passage 33 and passage 35 and the other connected chambers and apertures under fluid pressure. The passages 33 and 35 may be put under a pressure greater than that derived through the exhaustion of the chambers 26—22 by the expedient of turning the valve core 50 to the position of Figure 1, whereby the ports 46 and 56 are connected by the passage 53 and the ports 42 and 44 are connected by the passage 51 and opening the valve 43 to atmosphere and operating the pumping mechanism 42—56. This draws in air through valve 43 and forces it into the conduits 33 and 35 and the space between the rod 28 and the wall 27 of member 23 and between the member 23 and the cylinder wall 21 of the member 20.

The pressure in the chambers 22 and 26 can be increased to the pressure desirable for resisting the alighting and riding shocks by positioning the valve core 50 as in Figure 7 and opening the valve 43 and operating the pumping means 57—62 which forces air from valve 43 into the passage 38 and chambers 22 and 26 under pressure.

When it is desired to introduce more oil either into the chambers 26 and 22 when the mechanism is distended, or into the passages 33 and 35 when the mechanism is retracted, the valve 47 is opened and the pumping means 57—62 is operated with the valve core in either position of Figure 7 or Figure 1 according to whether the mechanism is distended or contracted.

Figure 9:
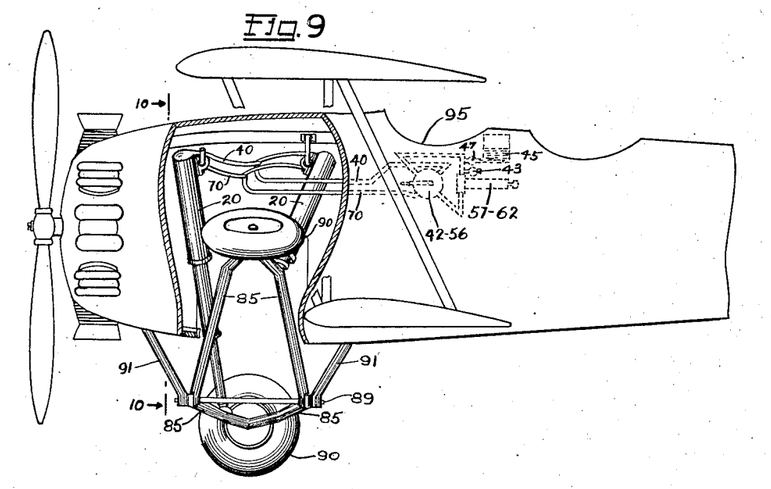
Figure 9 is a lateral view partly in section showing an aircraft adapted to alight upon land and equipped with a suitable embodiment of this invention and showing one wheel in the distended position and the other wheel in the retracted or sheltered position.
Figure 10:
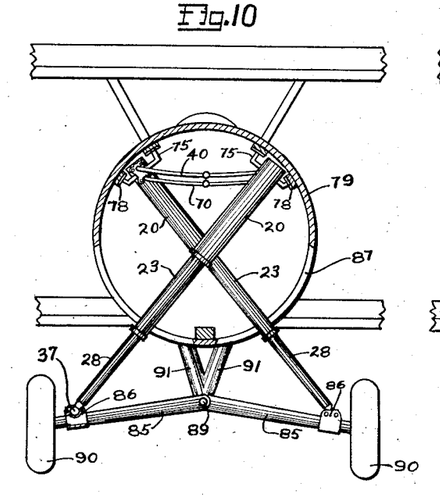
Figures 10 and 11 are other sectional views of the aircraft shown in Figure 9 and show sections taken substantially along line 10—10 of Figure 9 and for the purpose of illustration, showing the wheels in distended position in Figure 10 and in retracted or sheltered position in Figure 11.
Figure 11:
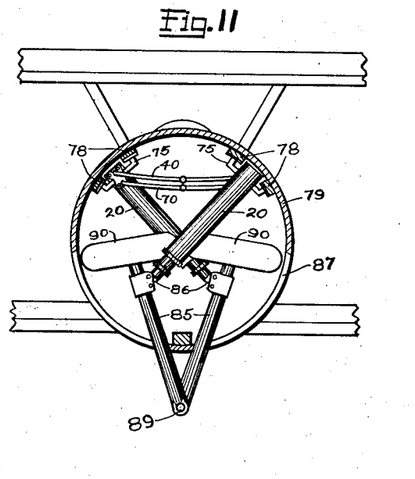

One means whereby an aircraft designed to take off and alight upon the land by means of wheels may be provided with the device of this invention is illustrated in Figures 9, 10 and 11, wherein two retracting and distending cylinders 20 are mounted crosswise upon supporting bars 75 anchored to frame members 78 within a monocoque fuselage 79 and adapted to have universal relative movement therebetween within a suitable range by a ball enlargement of the bars 75 fitting into the socket 36 and secured therein by the socket clamp 84. The landing means or wheels pass through apertures 87 within the fuselage 79 and are connected to forked axle shafts 85 for the wheels at points adjacent the wheels by any suitable ball 37 and socket means 86 permitting universal articulation within suitable range. The forked axle shafts 85 are pivoted centrally beneath the fuselage 79 by means of a pivot pin 89 carried in struts 91 rigidly secured to the fuselage 79. The forked axle shafts 85 carry the landing wheels 90 and are so disposed upon the pivot 89 that when the landing wheels are retracted or withdrawn into the fuselage, the axle shafts 85 and wheels 90 will be drawn upwardly into the interior of the fuselage 79 through the apertures 87. In such retracted position, the axle shafts 85 will be in "fore and aft" alignment with the struts 91.

The retracting and distending mechanisms are attached to opposite axle shafts at their lower ends and are anchored at their upper ends in staggered relation, that is, one forward of the other with respect to the longitudinal axis of the aircraft in order that the axle shafts 85 and the wheels 90 may be nested in close proximity thereto as in Figure 11. Pipes 40 are connected to a common pipe and the pipes 70 are connected to a common pipe running to the fluid system comprising the valve 42—56, pump 57—62, valve 43 and the tank 45 and valve 47 located at any convenient place within the reach of the operator of the aircraft and shown in dotted lines in Figure 9 along the wall of the fuselage 79 adjacent the cockpit.

Figure 8:
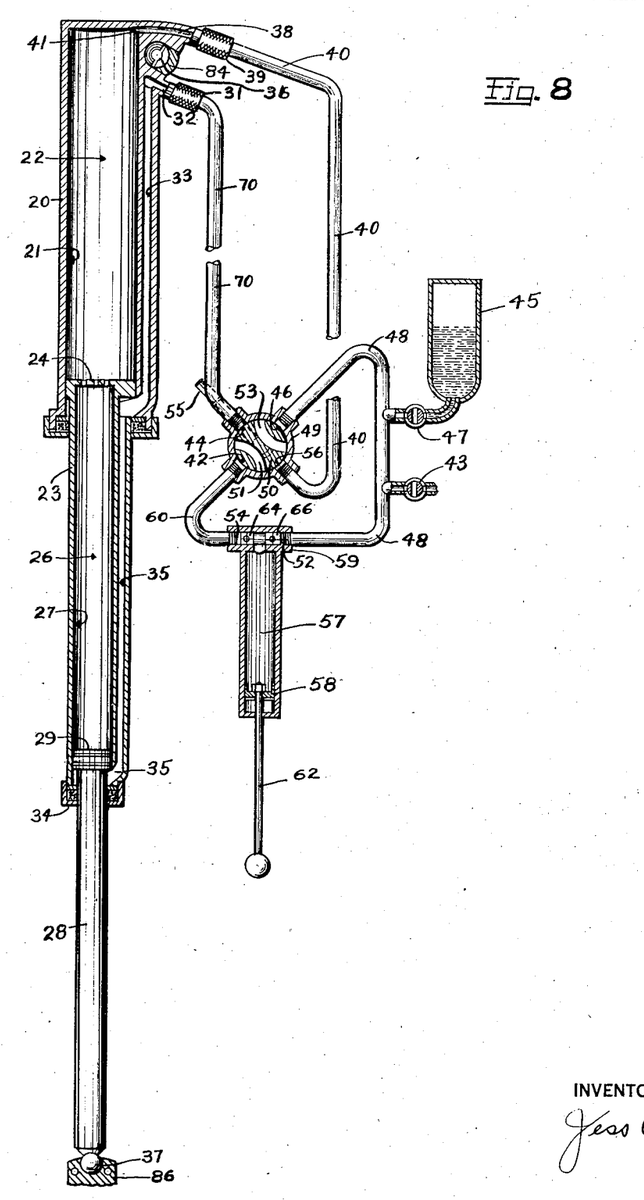
Figure 8 is a view of the retracting and distending mechanism as in Figure 1, except the valve means of the fluid pressure and evacuating means is in closed or locked position to retain the retracting and distending mechanism in distended position.

When the retracting and distending mechanisms are retracted by the pilot properly arranging the valve core 50 as in Figure 1 and the pump 57—62 is operated, the ends of the axle shafts 85 and the wheels 90 are drawn upwardly into the fuselage 79 and secured in that position while the aircraft is in flight by closing the valve 42—56 as in Figure 8 or using some suitable mechanical means not shown.

When the aircraft is about to land, movement of the valve core 50 to the position shown in Figure 7 and operation of the pump 57—62 will extend the retracting and distending mechanism and the axles 85 and wheels 90 will be forced downward and outward to the extended position beneath the fuselage for the purpose of alighting.

Figure 12:
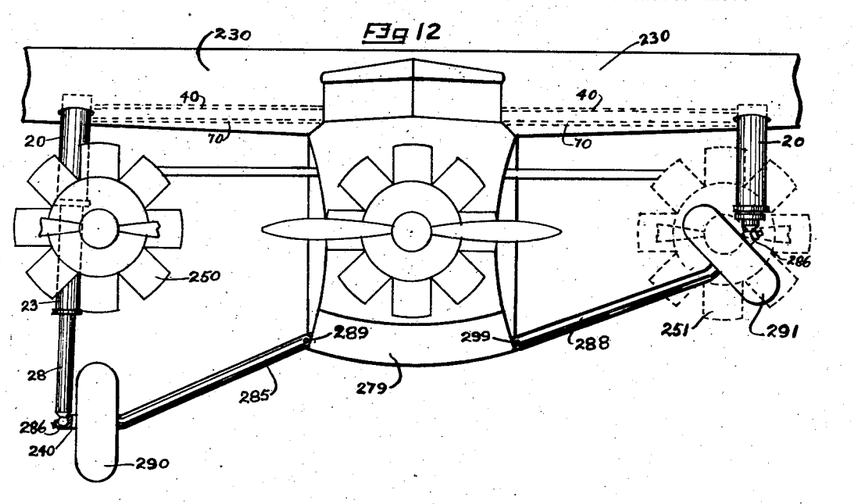
Figure 12 is a head-on view partly in section and partly diagrammatic showing the retracting and distending mechanism applied to an aircraft to move the alighting means into sheltered positions behind motors spaced from the body of the craft, and showing, for the purpose of illustration, one wheel in the sheltered position and one wheel in the distended position.
Figure 13:
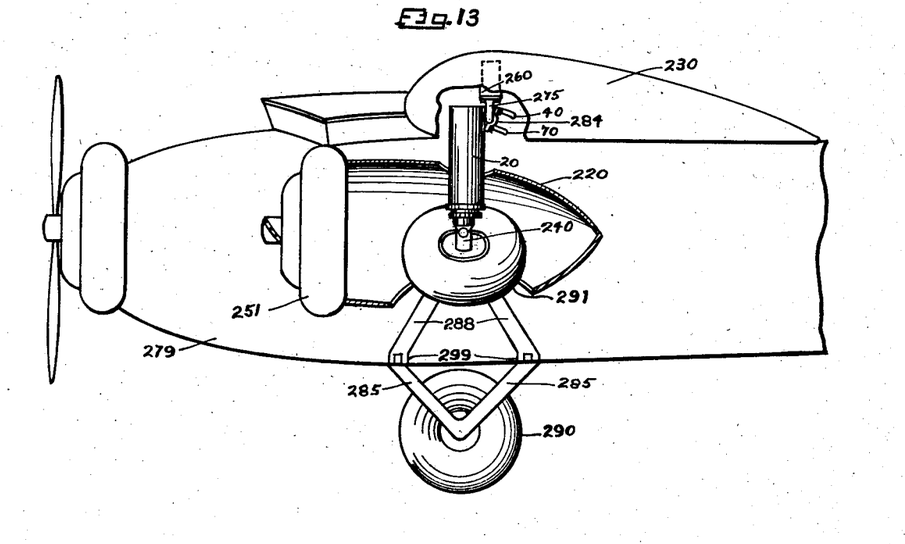
Figure 13 is a lateral view of the aircraft shown in Figure 12 and showing in section a shield or sheltering means for the wheels into which one of the wheels has been drawn by the retracting mechanism of this invention.

An embodiment of this invention as adapted to aircraft having sheltered positions spaced from the fuselage as shown in Figures 12 and 13, wherein the landing wheels 290 and 291 are adapted to be retracted to positions behind motors 250 and 251 which are spaced from the body or fuselage 279 of the aircraft and carried by the wings. For purposes of description and illustration, one of the wheels 290 of the aircraft is shown in extended or alighting position and the other 291 is shown in sheltered position, but it will be understood that in operation, both wheels 290 and 291 will be simultaneously retracted as shown by the position of wheel 291 and extended as shown by the position of wheel 290. Retracting and distending mechanism 20—28 are secured by a universally movable connection, as a ball and socket joint 284 clamping the mechanism 20—28 to a suitable support, such as the anchor rod 275 which is passed through an aperture in the lower covering of the wing with free clearance therefrom and being secured to the wing 230 in some suitable manner, as by bolting to the spar 260 which extends longitudinally the length of the wing. The lower end of the retracting and distending mechanism is connected by means permitting of universal motion, such as the ball and socket joint 286 at the end of the axle shafts 240, one of which carries the landing wheel 290 and is carried with the forked shafts 285 pivoted at 289 to the body or fuselage 279, in such manner that the wheel 290 may be swung upward, and the other which carries the landing wheel 291 and is carried by the forked shafts 288 pivoted at 299 to the body or fuselage 279, in such manner that the wheel 291 may be swung upward. Motors 250 and 251, shown diagrammatically in full and dotted lines in Figure 12, are spaced apart from the body or fuselage 279 and are rigidly affixed to the wing 230 or fuselage 279 in some suitable manner, not shown, for the purpose of propelling same.

The retracting and distending mechanisms 20—28 are connected by the fluid lines 40 and 70 shown in dotted lines in Figure 12 as running through the interior of the wing to some convenient central location within the aircraft and there connecting with a suitable form of fluid pressure and evacuating means such as that previously described and shown in Figures 1 through 8 which can be operated by the pilot. When it is desired to move the alighting means or wheels 290 and 291 into the retracted or sheltered position, the pilot of the aircraft sets in operation the fluid means heretofore described and contracts the retracting and distending mechanism thereby moving the landing wheels 290 and 291 upward to a sheltered position behind the motors 250 and 251 or some other part located about the aircraft. For the purpose of improving the aerodynamic effect of the alighting means and retracting and distending mechanisms in the sheltered or contracted positions, a hood, shell, or nacelle 220 may be provided having apertures through which the retracting mechanism may enter thereinto and a suitable aperture through which the wheel may be pulled. This shell, 220, may be of any desirable shape in order to minimize the "wind eddies" formed by its passage through the air which reduce the aerodynamic efficiency.

Figure 14:
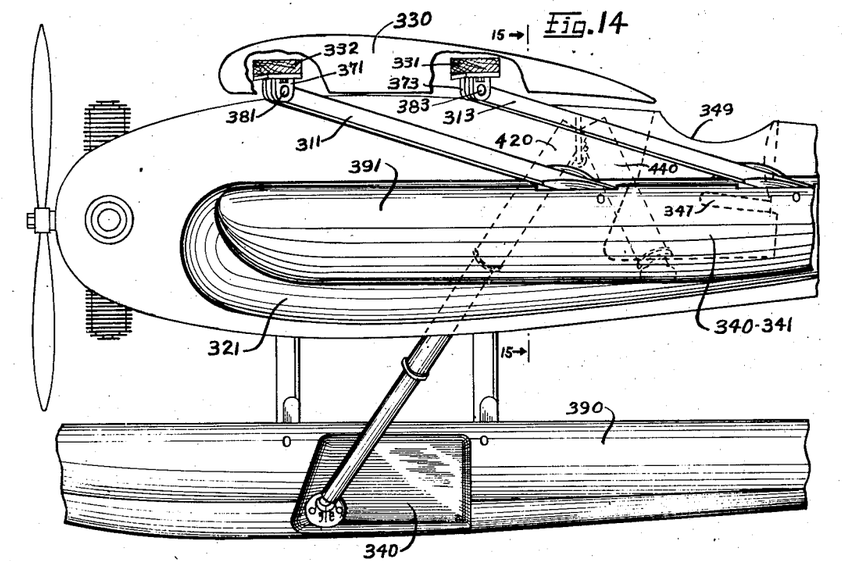
Figure 14 is a lateral view, partly in section, of an aircraft having a plurality of pontoons or floats to alight upon water and provided with the retracting mechanism of the invention and showing one of the pontoons or floats drawn into sheltered position and the other in extended position.
Figure 15:
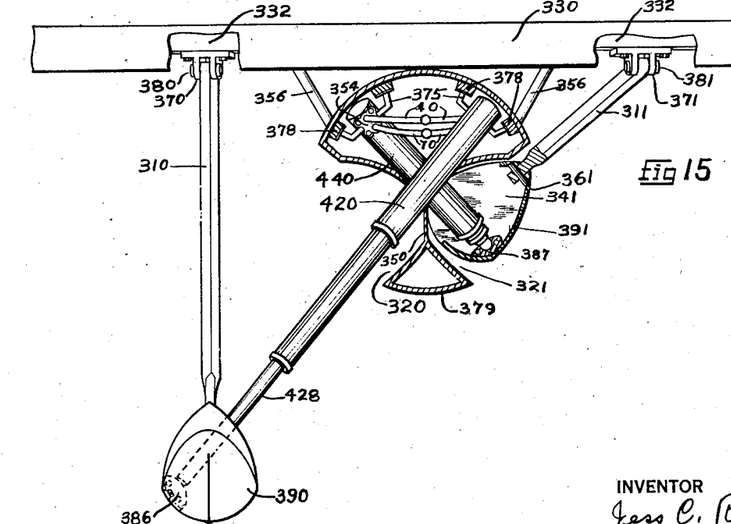
Figure 15 is a view partly in section of the aircraft shown in Figure 14 and taken substantially along the line 15—15 of Figure 14 and showing one pontoon or float in sheltered position and one in distended position.
Figure 16:
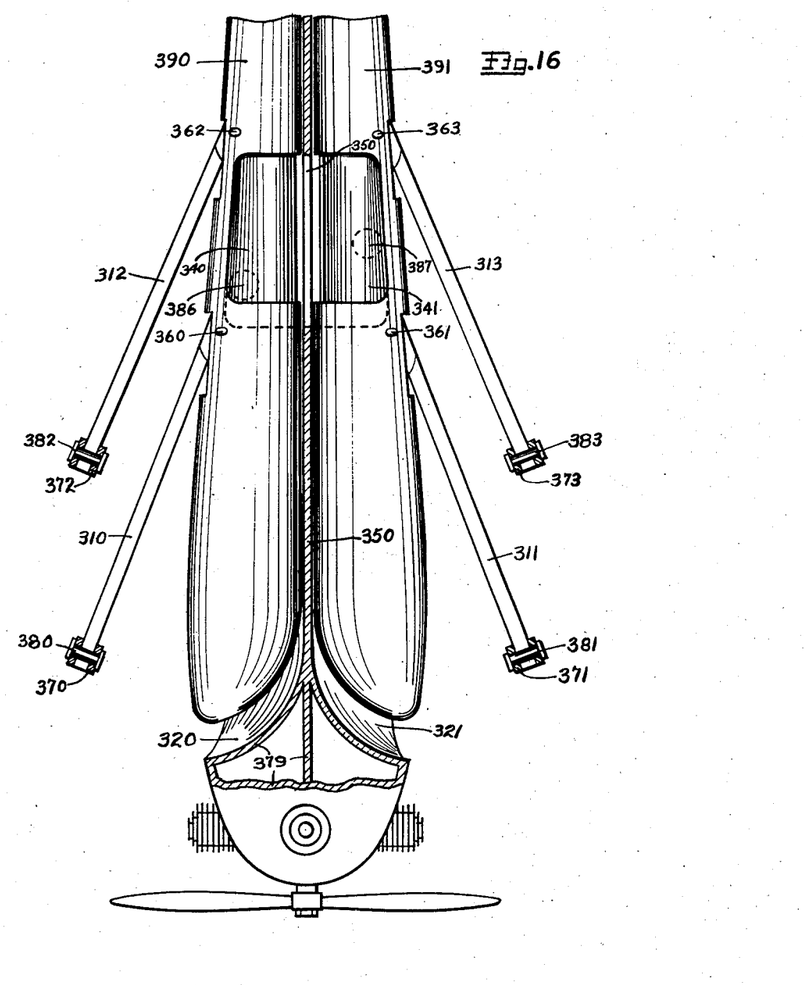
Figure 16 is a view partly in section and partly diagrammatic looking down upon the aircraft shown in Figures 14 and 15 and showing the "nesting" of the floats within body or fuselage cavities according to a particular embodiment of this invention.

An embodiment of this invention adapted to aircraft designed to take off and alight upon water and provided for this purpose with a plurality of floats, pontoons or other alighting means is illustrated in Figures 14, 15, and 16, wherein two identical retracting and distending mechanisms 420 and 440 having fluid connections through pipes 40 and 70 to a suitable fluid pressure and evacuating means located at some convenient central position within the fuselage or body 379 of the aircraft, which position is not shown. The retracting and distending mechanisms 420 and 440 are connected at their uppermost ends to the body or fuselage 379 of an aircraft by universal connections, such as ball and socket joints 354 affixed to securing members, such as the rods 375 which are secured to frame pieces 378.

An aircraft wing 330 is attached to the fuselage 379 in some suitable manner, as by the struts 356. The wing 330 is provided with a plurality of supporting members or spars 331 and 332 extending longitudinally of the wing and preferably within it.

The floats 390 and 391, in order to secure the aircraft, are connected to the wing 330 in such manner that they may be swung upward and inwardly into sheltered position about the body of the aircraft when in flight in the following manner: At suitable positions along the spars 331 and 332 a plurality of posts 310, 311, 312 and 313 are pivotally carried in the brackets 370, 371, 372 and 373 by the pivot pins 380, 381, 382 and 383 so positioned that the pontoons or floats 390 and 391 may be swung upwardly, backwardly and inwardly into body cavities 320 and 321, the lower ends of the posts turning upon the pivots 360, 361, 362 and 363 carried by the floats thereby maintaining the floats in substantially horizontal position when the said floats 390 and 391 are drawn upwardly and rearwardly into the cavities 320 and 321 by the contracting of the retracting and distending mechanism 420 connected by the ball and socket joint 386 to the float or alighting means 390 and by the contracting and distending mechanism 440 connected by ball and socket joint 387 to the float or alighting means 391.

The floats 390 and 391 are provided with cut-away or cavity portions 340 and 341 upon the inner sides toward the body in such manner that when the floats are in their sheltered positions within the body cavities 320 and 321, the float cavities 340 and 341 substantially face each other to provide a space 340—341, shown in dotted lines in Figure 14, beneath the cockpit 349 of the aircraft to accommodate the pilot and the seat 347. These float cavities 340 and 341 may be duplicated rearwardly for the accommodation of one or more additional persons or objects. The body cavities 320 and 321 are separated by a longitudinally extending partition 350 which is cut away opposite the float cavities 340 and 341 in order to provide an undivided space therebetween.

The retracting and distending mechanism 420 is shown connected at its upper end to the fuselage 379 by the ball and socket joint 354 located forwardly of the similar ball and socket joint of retracting and distending mechanism 440 and the lower end of said retracting and distending mechanism 420 is connected by the ball and socket joint 386 to the float 390 at a position within the float cavity 340 located forwardly of the similar ball and socket joint 387 connecting the lower end of the retracting and distending mechanism 440 to the float 391 as shown diagrammatically in dotted lines in Figure 16.

The mechanism 420 is connected forwardly of the companion mechanism 440 in order that there will be no interference with each other when both floats are fully retracted as indicated by the position of the floats in Figure 16.

While I have shown the retracting and distending mechanism of this invention as having an outer cylindrical member with a connection means, a single intermediate cylindrical member having a piston head and a piston and rod having a connection means and reciprocating within the intermediate cylindrical member, it should be understood that it may be desirable that the mechanism have more than one such intermediate cylindrical member and the same may be increased in number without deviating from the principles of this invention.

Many variations and modifications of the various forms of this invention will occur to those skilled in the art in the arrangement as well as in the component parts without departing from the principles of this invention.

What is claimed is:—

1. In an aircraft having a retractable landing gear, a retracting means comprising an outer cylinder, at least one intermediate cylinder and piston in telescopic relation within the outer cylinder, a rod and piston reciprocating within an innermost cylinder, a fluid means connecting the outer cylinder with the intermediate cylinder or cylinders to telescopically retract the piston simultaneously and fluid means connecting the outer cylinder with the intermediate cylinder or cylinders to telescopically extend the pistons.

2. In an aircraft having a retractable landing gear, retracting means comprising an outer cylinder, at least one intermediate cylinder and piston in telescopic relation within the outer cylinder, a rod and piston reciprocating within the innermost cylinder, a fluid means connecting the outer cylinder with the intermediate cylinder or cylinders to simultaneously enforce movement of the pistons in one direction thereby telescopically contracting said retracting means, and a fluid means connecting the outer cylinder with the intermediate cylinder or cylinders to enforce movement of the pistons in the opposite direction to telescopically extend the retracting means.

3. In an aircraft having a retractable landing gear, retracting means comprising an outer cylinder, at least one intermediate cylinder and piston in telescopic relation within the outer cylinder, a rod and piston reciprocating within the innermost cylinder, a fluid means carried with the wall of the intermediate cylinder or cylinders connecting the outer cylinder with the intermediate cylinder or cylinders to telescopically retract the pistons simultaneously and a fluid means connecting the outer cylinder with the intermediate cylinder or cylinders to telescopically extend the pistons.

4. In an aircraft having a retractable landing gear, retracting means comprising an outer cylinder, at least one intermediate cylinder and piston in telescopic relation within the outer cylinder, a rod and piston reciprocating within the innermost cylinder, a fluid means carried with the wall of the intermediate cylinder or cylinders connecting the outer cylinder with the intermediate cylinder or cylinders to simultaneously enforce movement of the pistons in one direction to telescopically retract the pistons and a fluid means connecting the outer cylinder with the intermediate cylinder or cylinders to simultaneously enforce movement of the pistons in the opposite direction thereby telescopically extending the retracting means.

5. In an aircraft having a retractable landing gear, retracting means comprising an outer cylinder, at least one intermediate cylinder and piston in telescopic relation within the outer cylinder, a rod and piston reciprocating within the innermost cylinder, a fluid means carried with the wall of the intermediate cylinder or cylinders connecting the outer cylinder with the intermediate cylinder or cylinders to simultaneously retract the pistons and cylinders to a length less than one-half of its extended length and a fluid means connecting the outer cylinder with the intermediate cylinder or cylinders to telescopically extend the pistons and cylinders.

6. In an aircraft having a retractable landing gear, retracting means comprising an outer cylinder, at least one intermediate cylinder and piston in telescopic relation within the outer cylinder, a rod and piston reciprocating within the innermost cylinder, a fluid means carried with the wall of the intermediate cylinder or cylinders connecting the outer cylinder with the intermediate cylinder or cylinders to simultaneously retract the pistons and maintain the same against telescopic extension and a fluid means connecting the outer cylinder with the intermediate cylinder or cylinders to telescopically extend the pistons and to resiliently maintain the same against telescopic retraction.

7. In an aircraft having a retractable landing gear, retracting means comprising an outer cylinder, an intermediate cylinder and piston reciprocating within the outer cylinder, a rod and piston reciprocating within the intermediate cylinder, a fluid passage carried with the wall of the intermediate cylinder connecting the outer cylinder with the intermediate cylinder and a fluid passage in the intermediate cylinder and piston connecting the outer cylinder with the intermediate cylinder in all relative positions of the pistons and cylinders, a fluid means connecting with said pistons and cylinders to telescopically retract and maintain the same against telescopic extension and a fluid means connecting with said pistons and cylinders to telescopically extend and resiliently maintain same against retraction.

8. In an aircraft having a body formed with a plurality of recessed cavities, a landing gear comprising a plurality of landing wheels rotatably carried upon ends of a plurality of shafts pivotally carried by the aircraft, a plurality of retracting means having a connection with the aircraft and a connection with the landing gear and comprising an outer cylinder, at least one intermediate cylinder and piston in telescopic relation within the outer cylinder, a rod and piston reciprocating within the innermost cylinder, a fluid means carried with the wall of the intermediate cylinder or cylinders connecting the outer cylinder with the intermediate cylinder or cylinders in all their relative positions of retracting the wheels into the body cavities and fluid means connecting the outer cylinder with the intermediate cylinder or cylinders in all their relative positions of extending said landing gear.

9. In an aircraft having a body formed with a plurality of apertures, a landing gear comprising a plurality of landing wheels carried rotatably upon axle shafts pivotally carried by the body centrally therebeneath to rotate about a fixed point in planes substantially transverse of the longitudinal axis of the aircraft, a plurality of retracting means to retract and extend the wheels through the apertures in the body of the aircraft.

10. In an aircraft having a body formed with a plurality of apertures, a landing gear comprising a plurality of landing wheels rotatably carried on ends of a plurality of axle shafts, said shafts pivotally carried by the body centrally therebeneath and adapted to rotate in planes substantially transverse of the longitudinal axis of the aircraft, a plurality of retracting means comprising a plurality of cylinders and pistons in telescopic relation, said retracting means being secured to the sides of the body of the aircraft opposite the wheels carried thereby, fluid means to retract the wheels through the apertures to positions within the body and fluid means to extend the said wheels.

11. In an aircraft having a body, formed with a plurality of apertures, a landing gear comprising a plurality of landing wheels rotatably carried upon a plurality of shafts pivotally carried by the body centrally therebeneath to rotate in planes substantially transverse of the longitudinal axis of the aircraft, a plurality of retracting means having a connection with the aircraft and a connection with the landing gear and comprising an outer cylinder, at least one intermediate cylinder and piston in telescopic relation within the outer cylinder, a rod and piston reciprocating within the innermost cylinder, and fluid means to simultaneously actuate the pistons to move said wheels to and from the apertures in the body of the aircraft.

12. In an aircraft having a body formed with a plurality of apertures, a landing gear comprising a plurality of landing wheels rotatably carried upon a plurality of shafts pivotally carried by the body centrally therebeneath to rotate in planes substantially transverse of the longitudinal axis of the aircraft, a plurality of retracting means, said means comprising an outer cylinder, at least one intermediate cylinder and piston in telescopic relation within the outer cylinder, a rod and piston reciprocating within the innermost cylinder and fluid means carried with the wall of the intermediate cylinder or cylinders connecting the outer cylinder with the intermediate cylinder or cylinders in all relative positions of said cylinders to retract and extend the wheels through the apertures within the body of the aircraft.

13. In an aircraft, a landing gear comprising an alighting means carried upon ends of a plurality of shafts, pivotally carried with the aircraft, a retracting means comprising an outer cylinder, at least one intermediate cylinder and piston in telescopic relation within the outer cylinder, a rod and piston reciprocating within the innermost cylinder, a fluid means carried with the wall of the intermediate cylinder or cylinders connecting the outer cylinder with the intermediate cylinder or cylinders in all relative positions thereof to retract and extend the alighting means.

14. In an aircraft having a body formed with a plurality of float cavities and a landing gear comprising a plurality of floats carried upon ends of a plurality of shafts pivotally carried by the aircraft, a plurality of retracting means comprising an outer cylinder, at least one intermediate cylinder and piston in telescopic relation within the outer cylinder, a rod and piston reciprocating within the innermost cylinder, a fluid means carried with the wall of the intermediate cylinder or cylinders connecting the outer cylinder with the intermediate cylinder or cylinders to retract the floats into the float cavities and to extend the floats in spaced relation to the body.

15. In an aircraft having a body formed with a plurality of float cavities and a landing gear comprising a plurality of floats pivotally carried upon ends of a plurality of shafts to rotate in planes substantially parallel to the longitudinal axes of the floats, said shafts being pivotally carried by the aircraft to rotate in planes intercepting the longitudinal axis of the body rearwardly, a plurality of retracting means comprising an outer cylinder, at least one intermediate cylinder and piston in telescopic relation within the outer cylinder, a rod and piston reciprocating within the innermost cylinder, a fluid means carried with the walls of the intermediate cylinder or cylinders connecting the outer cylinder with the intermediate cylinder or cylinders to retract the floats into the float cavities recessed in the body and fluid means connecting the outer cylinder with the intermediate cylinder or cylinders to extend the floats.

16. In an aircraft having a body formed with a plurality of longitudinally disposed cavities, a landing gear comprising a plurality of floats disposed in substantially parallel relationship and having portions cut away to form cavities in the proximate sides, a plurality of retracting means comprising an outer cylinder, at least one intermediate cylinder and piston in telescopic relation within the outer cylinder, a rod and piston reciprocating within the innermost cylinder, a fluid means carried with the wall of the intermediate cylinder or cylinders connecting the outer cylinder with the intermediate cylinder or cylinders to retract the floats into the cavities in the body and to extend the said floats.

17. In a retracting mechanism for an aircraft landing gear, a plurality of telescopic cylinders and pistons to retract and extend said mechanism, a port in each end of each cylinder, fluid passages connected to at least the corresponding ports of the upper end of each cylinder throughout the range of movement of said mechanism, a source of fluid pressure connected to the passages and valve means in the fluid passages to selectively connect the cylinders with said pressure source.

18. In a retracting mechanism for an aircraft landing gear, a plurality of telescopic cylinders and pistons to retract and extend said mechanism, a port in each end of each cylinder, fluid passages connected to the corresponding ports of each cylinder throughout the range of movement of said mechanism, a source of fluid pressure connected to the passages and valve means in the fluid passages to selectively connect the cylinders with said pressure source.

19. In a retracting mechanism for an aircraft landing gear, a plurality of telescopic cylinders and pistons to retract and extend said mechanism, a port in each end of each cylinder, fluid passages which at all times are connected to the corresponding ports of each cylinder, a source of fluid pressure and a source of reduced pressure and valve means in the fluid passages to selectively connect the corresponding ports in each cylinder to the source of fluid pressure or the source of reduced pressure.

20. In a retracting mechanism for an aircraft landing gear, an outer cylinder and one or more intermediate cylinders and pistons in telescopic relation to retract and expand said mechanism, a port in each end of each cylinder, fluid connections connecting corresponding ports of each cylinder in all relative positions of the cylinders, a source of fluid pressure connected to the passages and valve means in the fluid passages to selectively connect the ports with said pressure source.

21. In an aircraft, a body having a plurality of apertures, a landing gear comprising a plurality of landing wheels rotatably carried upon shafts pivotally carried by the aircraft, a retracting mechanism for the landing gear comprising a plurality of cylinders and pistons in telescopic relation to retract and extend said mechanism, a port in each end of each cylinder, fluid passages which maintain connection to at least the corresponding ports of the upper end of each cylinder irrespective of the relative positions between said cylinders, a source of fluid pressure connected to the passages and valve means in the fluid passages to selectively connect the cylinders with a fluid supply or exhaust, said landing wheels being adapted to be retracted through the apertures by the retracting mechanism to positions within the body.

22. In an aircraft, a body having a plurality of apertures, a landing gear comprising a plurality of landing wheels rotatably carried upon shafts carried by the aircraft and adapted to rotatably pivot in planes substantially transverse of the longitudinal axis of the aircraft, a plurality of retracting mechanisms comprising a plurality of cylinders and pistons in telescopic relation to retract and extend said mechanism, a port in each end of each cylinder, fluid passages which maintain communication to at least the corresponding ports of the upper end of each cylinder irrespective of the relative position between said cylinders, a source of fluid pressure connected to the passages and valve means in the fluid passages to selectively connect the cylinders with the fluid supply or exhaust, said landing wheels being adapted to be retracted through the apertures by the retracting mechanisms to positions within the body.

23. In an aircraft, a body having a plurality of apertures, a landing gear comprising a plurality of landing wheels rotatably carried upon shafts carried by the aircraft and adapted to rotatably pivot in planes substantially transverse of the longitudinal axis of the aircraft, a plurality of shock absorbing and retracting mechanisms comprising a plurality of cylinders and pistons in telescopic relation to retract and extend said mechanism, a port in each end of each cylinder, fluid passages to at least the corresponding ports of the upper end of each cylinder, a source of fluid pressure connected to the ports in all relative positions of the cylinders and valve means in the fluid passages to selectively connect the cylinders with a fluid supply or exhaust, said landing wheels being adapted to be retracted through the apertures by the retracting mechanisms to positions within the body.

24. In an aircraft having a body and a wing, a landing gear comprising a plurality of landing wheels rotatably carried upon shafts carried by the aircraft, a plurality of shock absorbing and retracting mechanisms having a connection with the aircraft and a connection with the landing gear and comprising a plurality of cylinders and pistons in telescopic relation to retract and extend said mechanism, a port in each end of each cylinder, fluid passages to at least the corresponding ports of the upper end of each cylinder, a source of fluid pressure connected to the ports in all relative positions of the cylinders and valve means in the fluid passages to selectively connect the cylinders with a fluid supply or exhaust, said shock absorbing and retracting mechanisms being adapted to retract the landing wheels toward the wing and to extend the landing wheels and maintain the same resiliently in extended position.

25. In an aircraft, a landing gear comprising a float carried upon the ends of a plurality of shafts pivotally carried by the aircraft, a retracting means comprising a plurality of cylinders and pistons in telescopic relation, a port in each end of each cylinder, fluid connections to at least the corresponding ports of the upper end of each cylinder, a source of fluid pressure connected to the ports in all relative positions of the cylinders and valve means in the fluid passages to selectively connect the cylinders with a fluid supply or exhaust.

26. In an aircraft having a body, a recess in each side of the body, a landing gear comprising a plurality of floats carried upon ends of a plurality of shafts carried by the aircraft and adapted to be swung into the body recesses, a plurality of retracting means having a connection with the aircraft and a connection with the floats to obliquely retract the floats into the body recesses, said retracting means comprising a pluraltiy of cylinders and pistons in telescopic relation, a port in each end of each cylinder, fluid connections to at least the corresponding ports of the upper end of each cylinder, a source of fluid pressure connected to the ports in all relative positions of the cylinders and valve means in the fluid passages to selectively connect the cylinders with a fluid supply or exhaust.

27. In an aircraft having a body formed with a recess in each side thereof, a landing gear comprising a plurality of floats pivotally carried upon ends of a plurality of shafts to pivotally rotate in planes substantially parallel to the longitudinal axes of the floats, said shafts being pivotally carried by the aircraft to pivotally rotate in planes intercepting the longitudinal axis of the body, a plurality of retracting mechanisms to obliquely retract the floats into the recesses, comprising a plurality of cylinders and pistons in telescopic relation to retract and extend said mechanism, a port in each end of each cylinder, fluid connections to at least the corresponding ports of the upper end of each cylinder, a source of fluid pressure connected to the connections and valve means in the fluid connections to selectively connect the cylinders with the fluid supply or exhaust.

28. In an aircraft having a body formed with a recess in each side, a landing gear comprising a plurality of floats carried pivotally in substantially parallel relationship upon shafts carried by the aircraft and adapted to swing upon said shafts into the body recesses, said floats having portions cut away to form recessed portions in the proximate sides, a plurality of retracting mechanisms to retract the floats into the body recesses comprising a plurality of cylinders and pistons in telescopic relation to retract and extend, a port in each end of each cylinder, fluid passages to at least the corresponding ports of the upper end of each cylinder, a source of fluid pressure connected to the ports in all positions of the cylinders and valve means in the fluid passages to selectively connect the cylinders with a fluid supply or exhaust.

29. In an aircraft, a body having a longitudinally disposed recess in each side thereof, a landing gear comprising a plurality of floats, a plurality of shafts having pivotal connections with the aircraft and with the floats and adapted to respectively swing the floats from a position below and in advance of said body obliquely into the recesses in the body, and means operable from the body of the aircraft to retract and extend the floats.

30. In an aircraft having a body and a wing, a landing gear comprising a plurality of landing wheels rotatably carried upon shafts by the aircraft, a plurality of retracting mechanisms adapted to retract the landing wheels toward the wing and to extend the landing wheels and maintain the same in extended position, said retracting means comprising a plurality of cylinders and pistons in telescopic relation, a port in each end of each cylinder, fluid passages to at least the corresponding ports of the upper end of each cylinder, a source of fluid pressure connected to the passages in all relative positions of the cylinders and valve means in the fluid passages to selectively connect the cylinders with a fluid supply or exhaust.

31. A mechanism for operating an aircraft landing gear comprising a plurality of telescopically mounted cylinders and pistons and means for moving said cylinders and pistons with respect to each other to retract or extend said gear, said means comprising a source of fluid force, and a passage means connecting said source to each of said pistons at all times throughout their range of movement for retracting or extending said gear.

32. A mechanism for operating an aircraft landing gear comprising a plurality of telescopically mounted cylinders and pistons and means for moving said cylinders and pistons with respect to each other to retract or extend said gear, said means comprising a source of fluid force, and a passage means connecting said source to each of said pistons at all times throughout their range of movement for retracting or extending said gear and valve means in said passage means to selectively control the fluid and maintain said pistons in either a retracted or extended position as desired.

33. In an aircraft, a landing gear comprising a plurality of landing wheels rotatably carried upon ends of a plurality of shafts pivotally carried by the aircraft, a plurality of mechanisms for retracting the landing gear comprising a plurality of telescopically mounted cylinders and pistons and means for moving said cylinders and pistons with respect to each other to retract or extend said gear, said means comprising a source of fluid force, and a passage means connecting said source to each of said pistons at all times throughout their range of movement for retracting or extending said gear.

34. In an aircraft, a mechanism for operating a landing gear comprising a main cylinder, an auxiliary cylinder operating therein as a piston, a piston operable in said auxiliary cylinder, said main cylinder having a passage in the wall thereof, said auxiliary cylinder having a passage in the wall thereof, said first named passage always in communication with said second named passage and said second named passage extending beneath said first named piston, all for the purpose herein set forth.

JESS C. RADNOR.